US006339748B1

United States Patent
Hiramatsu

(12) United States Patent
(10) Patent No.: US 6,339,748 B1
(45) Date of Patent: Jan. 15, 2002

(54) COORDINATE INPUT SYSTEM AND DISPLAY APPARATUS

(75) Inventor: Kazunori Hiramatsu, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/186,373

(22) Filed: Nov. 5, 1998

(30) Foreign Application Priority Data

Nov. 11, 1997 (JP) .............................................. 9-309096
Nov. 4, 1998 (JP) ........................................... 10-313739

(51) Int. Cl.[7] ................................................ G09G 5/00
(52) U.S. Cl. ....................... 702/159; 345/156; 345/157; 345/158; 345/173; 345/183
(58) Field of Search ......................... 702/159; 345/173, 345/175, 156, 157, 158; 353/66, 70, 28, 34; 359/443, 453, 635, 636, 630

(56) References Cited

U.S. PATENT DOCUMENTS

| | | | | |
|---|---|---|---|---|
| 5,736,975 A | * | 4/1998 | Lunetta | 345/156 |
| 5,818,421 A | * | 10/1998 | Ogino et al. | 345/157 |
| 5,914,783 A | * | 6/1999 | Barrus | 356/375 |
| 6,110,039 A | * | 8/2000 | Oh | 463/2 |

FOREIGN PATENT DOCUMENTS

JP 60-230228 * 11/1985

* cited by examiner

Primary Examiner—Marc S. Hoff
Assistant Examiner—Hien Vo
(74) Attorney, Agent, or Firm—Oliff & Berridge, PLC

(57) ABSTRACT

The present invention has a object to provide a coordinate input system imparting a coordinate input function onto a transmissive screen for image display such as a rear projecting display apparatus, which permits use of a ray reflecting indicator smaller in size and lighter in weight than a light pen and to improve easiness to use.

The coordinate input system of the invention has an infrared ray source 3 which projects an infrared ray onto the back surface of the transmissive screen 2 for image display, a CCD camera 4 which covers the back surface of the transmissive screen as a senses range, and an image information processing circuit 5 which generates coordinate information of a ray reflecting indicator 1 located in front of the transmissive screen 2, from output image information of the CCD camera.

21 Claims, 13 Drawing Sheets

COORDINATE INPUT SYSTEM AND DISPLAY APPARATUS

BACKGROUND OF THE INVENTION

1. Field of Invention

The present invention relates to a coordinate input system for imparting a digitizer function, i.e., a positional coordinate input function to a transmissive screen for image display such as a rear projection display apparatus, and a display apparatus using such a coordinate input system.

2. Description of Related Art

Recent diffusion of personal computers and projecting display apparatuses using a liquid crystal, a light bulb or a CRT is bringing about a common practice of presentation of electronic image information in the form of an enlarged projected image. If a positional instructing operation can be carried out directly on an image displaying screen, the presenter could operate a computer without leaving the screen position, and it would be possible to enter handwritten characters directly onto the screen, thus permitting an effective and efficient presentation. There are therefore developed methods for positional coordinate input on a screen.

An example of such methods for positional coordinate input on a transmissive screen for image display is the one disclosed in Japanese Unexamined Patent Publication No. 60-230,228. This method has a configuration as shown in FIG. 16. In this method, positional coordinates of a light emitting indicator 101 such as a light pen is determined by detecting an invisible ray spot such as an infrared ray spot projected from the light emitting indicator by means of a positional detector 103 such as a Position Sensitive Light Detector (PSD) provided behind a transmissive screen 102, together with a projecting tube 104 which is an image projector forming an image from an image ray onto the transmissive screen 102.

However, the light emitting indicator 101 such as a light pen must have a light emitting diode (LED) serving as a light source, a control circuit and a cell incorporated therein, leading to a larger size and a heavier weight. This method therefore has a problem in that, when an operator enters a positional instruction or handwritten characters onto the transmissive screen 102 with the light emitting indicator 101 in hand, handling is more difficult than in handling writing means such as a pen.

The present invention has therefore an object to achieve a coordinate input system easy to handle on a transmissive screen and a display apparatus provided with such a coordinate input system.

DISCLOSURE OF THE INVENTION (1) The coordinate input system of the present invention, imparting a coordinate input function to a transmissive screen which forms an image from an image ray projected by image ray projecting means, comprising: infrared ray projecting means which projects infrared ray to a back of the transmissive screen; image sensing means which picks up the infrared ray reflected by indicating means provided with reflecting means in front of the transmissive screen, from the back of the transmissive screen; and image information processing means which determines coordinates on the transmissive screen as specified by the instructing means from an output image signal provided as an output by the image sensing means.

According to the aforementioned configuration, the instructing means is required to be provided only with a function of reflecting a ray, thus eliminating the need to incorporate a cell or electronic components. It is possible, for example, to adopt a configuration in which a reflecting member is provided at the tip of a shape similar to that of ordinary writing means such as a pen. It is thus possible to achieve a shape and a weight substantially identical with those of the ordinary writing means, and provide an advantage of easiness to use by an operator without any uncomfortable sense.

(2) In the coordinate input system of the invention as described in (1) above, a projection optical axis of the infrared projecting means does not cross the plane of the transmissive screen at right angles.

According to the configuration described above, the optical axis of the reflected ray from the back of the transmissive screen of the projected infrared ray from the infrared ray source, i.e., the maximum intensity direction has an angle with a direction at right angles to the plane of the screen. As a result, when the incident optical axis of the image sensing means is at right angles to the plane of the screen, the amount of incidence of the rear reflected infrared ray into the image sensing means becomes smaller, and this brings about an advantage of improving the S/N ratio (signal/noise ratio) of the detecting system.

(3) In the coordinate input system of the invention as described in (1) above, the optical axis of the image sensing means does not cross the plane of the transmissive screen at right angles.

According to the above-mentioned configuration, when the optical axes of the reflected ray from the screen back of the infrared ray source and the reflected ray from the screen back of the image ray for image display are at right angles to the plane of the screen, the amount of incidence of these reflected ray to the image sensing means becomes smaller, and this provides an advantage of an improved S/N ratio of the detecting system.

(4) In the coordinate input system of the invention as described in (1) above, the infrared projecting means comprises a plurality of infrared ray sources which project infrared ray to different areas of the back of the transmissive screen.

According to the aforementioned configuration, as compared with projection of an infrared ray to the back of the transmissive screen by the use of a single infrared ray source, it is possible to project the infrared ray uniformly over the entire back surface of the transmissive screen, thus providing an advantage of an improved S/N ratio of the detecting system.

(5) In the coordinate input system of the invention as described in (4) above, projection optical axes of the plurality of infrared ray sources do not cross the plane of the transmissive screen at right angles, and the angles of incidence of the projection optical axes of the plurality of infrared ray sources with the plane of the transmissive screen are different from each other.

According to the foregoing configuration, it is possible to make settings so that the incidence is diagonal as far as possible by using a different angle of incidence for each infrared ray source between the projection optical axes of the plurality of infrared ray sources and the plane of the transmissive screen. It is therefore possible to cause the maximum intensity distribution of the rear reflected ray from the transmissive screen of the ray projected from the infrared ray source to have a large angular difference to a direction at right angles to the transmissive screen. The optical axis of the image sensing means should on the other hand be at right angles in general to the plane of the transmissive screen so that the trapezoidal distortion is not generated in the sense image. As a result, the amount of incidence of the rear reflected ray on the transmissive screen of the infrared ray source can be reduced, and this results in an advantage of an improved S/N ratio of the detecting system.

(6) In the coordinate input system of the invention as described in (1) above, reflecting means of the indicating means comprises a reflective member having selectivity of infrared rays.

According to the configuration as described above, reflection of ray other than the infrared ray by the ray reflecting indicator can be inhibited. It is therefore possible to prevent reflection of image ray projected onto the transmissive screen not pertinent to the positional detection, thus permitting improvement of the S/N ratio of the detecting system.

(7) In the coordinate input system of the invention as described in (1) above, the reflecting means of the indicating means comprises an optical filter selectively allowing transmission of the infrared ray and an optical reflective member.

According to the aforementioned configuration, the advantage of inhibiting reflection of light other than the infrared ray from the light reflecting indicator and improving the S/N ratio of the detecting system can easily be achieved by means of a common optical components such as an optical glass filter and a mirror.

(8) In the coordinate input system of the invention as described in (1) above, the image sensing means has an optical filter which selectively allows transmission of the infrared ray within a wavelength range selectively reflected by the reflecting means of the indicating means.

According to the above-mentioned configuration, there is available an advantage of optically removing disturbance ray other than the infrared reflected ray from the ray reflecting indicator and improving the S/N ratio of the detecting system.

(9) In the coordinate input system of the invention as described in (1) above, the image information processing means has a subtracter which calculates a difference between first image information provided by the image sensing means upon turning on the infrared ray projecting means and second image information provided by the image sensing means upon turning off the infrared ray projecting means.

According to the configuration mentioned above, it is possible to eliminate pickup image information during turn-off of the infrared ray source, i.e., disturbance ray which is not an infrared reflected ray from the reflecting indicator, and extract only the infrared reflected ray from the reflecting indicator, thus providing an advantage of improving the S/N ratio of the detecting system.

(10) In the coordinate input system of the invention as described in (1) above, the infrared ray projecting means has infrared ray source synchronization turn-on control means, which synchronizes the timing of turn-on and turn-off of the infrared ray projecting means with the timing of frame switching between the first image information and the second image information.

According to the above-mentioned configuration, it is possible to obtain images of the image sensing means upon turn-on and turn-off of the infrared ray source in two consecutive frames (unit images). In order to obtain the difference between the image information provided as an output by the image sensing means upon turn-on of the infrared ray source and the image information upon turn-off thereof, it suffices to determine the difference between the two consecutive frames. This provides an advantage of permitting achievement of a higher-speed processing than in determination of the difference between two frames distant apart from each other, and further, another effect of inhibiting the capacity of the FIFO which is a frame memory necessary for differential processing to only one frame, the minimum capacity.

(11) In the coordinate input system of the invention as described in (1) above, the image ray projecting means has projected image frame synchronization control means which synchronizes the frame timing of the first image information and the second image information with the frame timing of a projected image of the image ray projecting means.

According to the above configuration, an image ray often presents a marked correlation between consecutive frames. It is therefore possible to remove almost completely the effect of rear reflection of the image ray by the transmissive screen, which becomes disturbance ray in positional coordinate detection by determining the difference between the image information provided as an output by the image sensing means upon turn-on of the infrared ray source and the image information provided as an output by the image sensing means upon turn-off thereof, thus permitting improvement of the S/N ratio of the detecting system.

(12) In the coordinate input system of the invention as described in (1) above, the image information processing means has disturbance discriminating means which compares a luminance level of the second image information provided as an output of the image sensing means upon turn-off of the infrared ray projecting means and a determination level.

According to the aforementioned configuration, when there is present disturbance of at least a certain value, it is possible to prevent an erroneous input by prohibiting coordinate detection.

(13) The display apparatus of the invention, which is provided with a transmissive screen forming an image from an image ray projected by image ray projecting means, comprises infrared ray projecting means which projects an infrared ray onto the back of the transmissive screen; image sensing means which picks up an image of an infrared ray reflected by instructing means provided with reflecting means in front of the transmissive screen, from the back of the transmissive screen; and image information processing means which determines coordinates on the transmissive screen as specified by the instructing means from an output image signal provided by the image sensing means.

According to the above-mentioned configuration, the indicating means is required to be provided only with a ray reflecting function, and it is not necessary to incorporate a cell or electronic components. It is therefore possible to adopt a configuration in which a reflecting member is provided at the tip of a shape similar to ordinary writing means such as a pen, thus permitting achievement of a shape and weight as in the ordinary writing means. In service, therefore, an operator can handle it without any feeling of uncomfortability. There is thus available a display apparatus having an easy-to-use coordinate input system enabling an effective and efficient presentation.

DESCRIPTION OF THE PREFERRED EMBODIMENTS

Embodiments of the present invention will now be described with reference to the drawings.

First Embodiment

Figure 1:
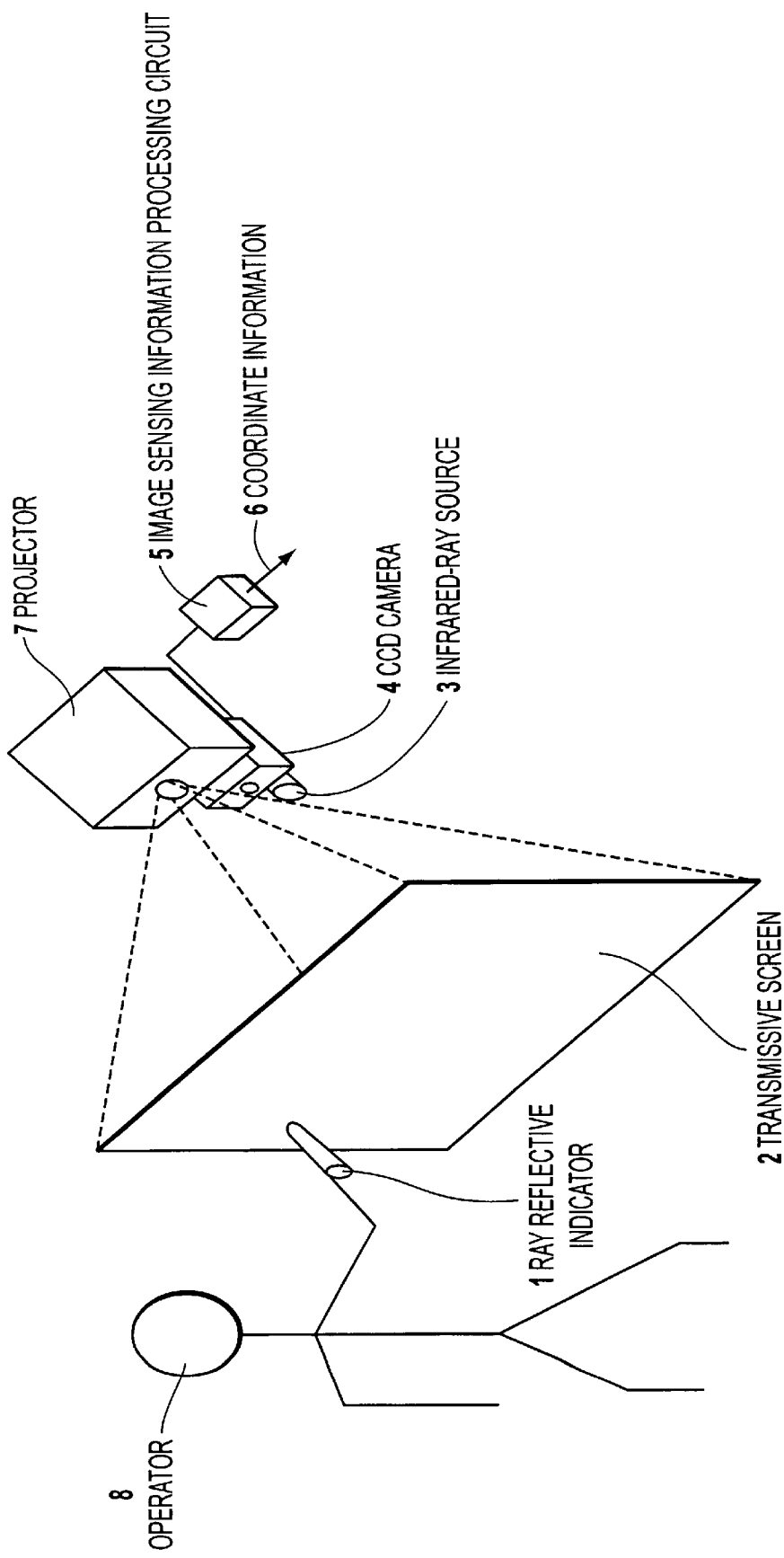
FIG. 1 is a perspective view illustrating an embodiment of the coordinate input system of the present invention.

FIG. 1 is a perspective view illustrating an embodiment of the coordinate input system of the invention. The system has a ray reflecting indicator 1, an infrared ray source 3, a CCD camera 4, and an image information processing circuit 5, for a coordinate input function on a transmissive screen 2. A projector 7 is, for example, a liquid crystal projector incorporating a liquid crystal light bulb, a projecting ray source and a projecting optical system, and serves to form an image from an image ray on the transmissive screen 2.

The infrared ray source 3 is infrared ray projecting means for projecting an infrared ray which is an invisible ray onto the entire back surface of the transmissive screen 2, and uses, for example, an infrared-wavelength LED. By using a plurality of infrared-wavelength LEDs arranged in an array, a more abundant infrared ray output is available. Interference of an image light which is visible light can be avoided by projecting an infrared ray which is an invisible ray.

The CCD camera 4 is image sensing means which picks up images over the entire back surface of the transmissive screen 2 for detecting a reflected ray provided by the ray reflecting indicator 1 of the infrared ray emitted by the infrared ray source 3. The CCD camera 4 should preferably have a selective sensitivity to an infrared ray because it is to detect an infrared ray, and should preferably comprise, for example, a two-dimensional CCD provided with an infrared transmissive filter.

The ray reflecting indicator 1 is an indicator for indicating the transmissive screen 2 from the front surface of the transmissive screen, i.e., a plane opposite to the back surface onto which the operator 8 projects an image ray, and has a ray reflecting member at least at the tip thereof. Applicable indicators include, for example, an indicator having a metal-plated tip, an indicator having a mirror at the tip thereof, and an indicator fully made of a light-reflecting metal.

Figure 2:
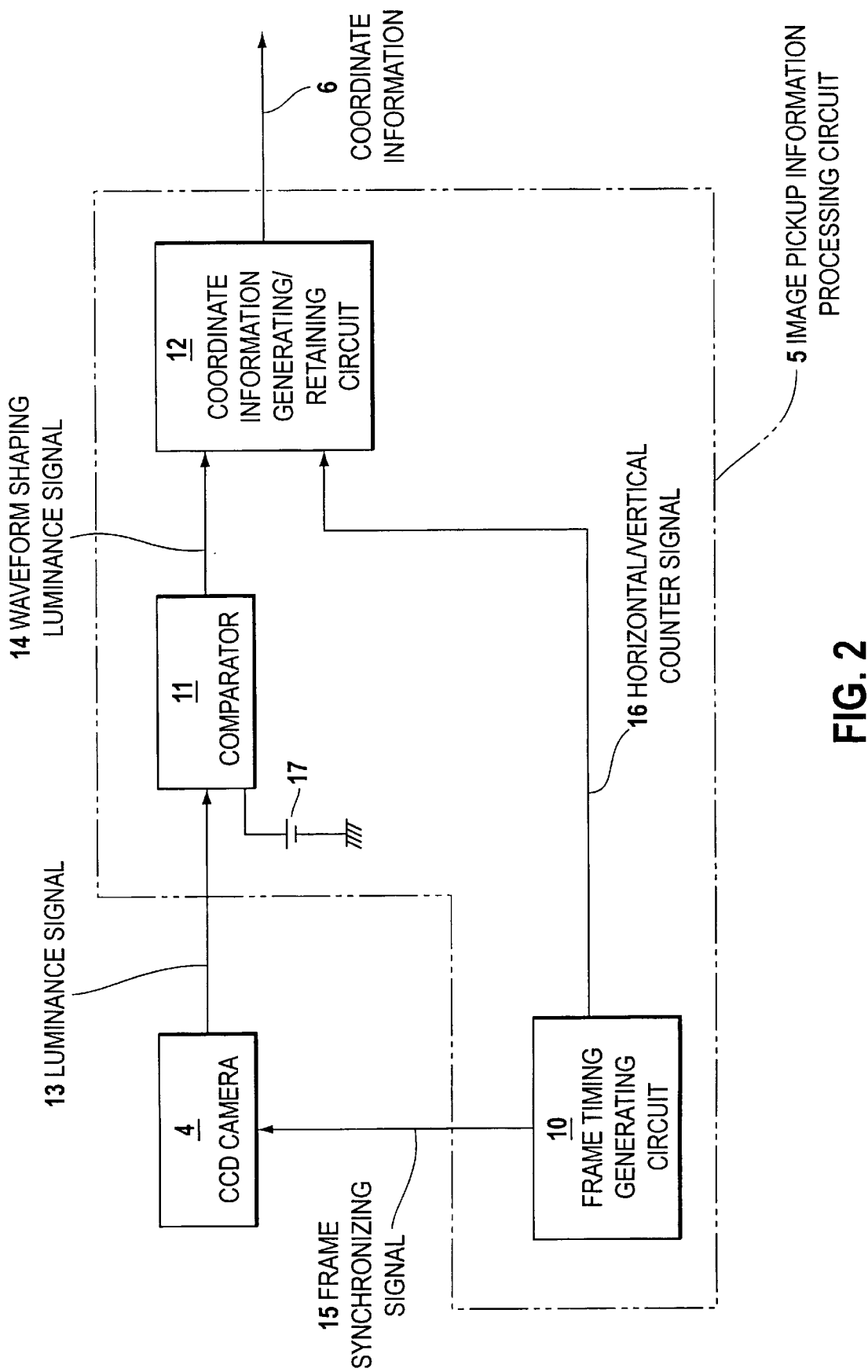
FIG. 2 is a block diagram illustrating an embodiment of the image information processing circuit of the coordinate input system of the invention.
Figure 3:
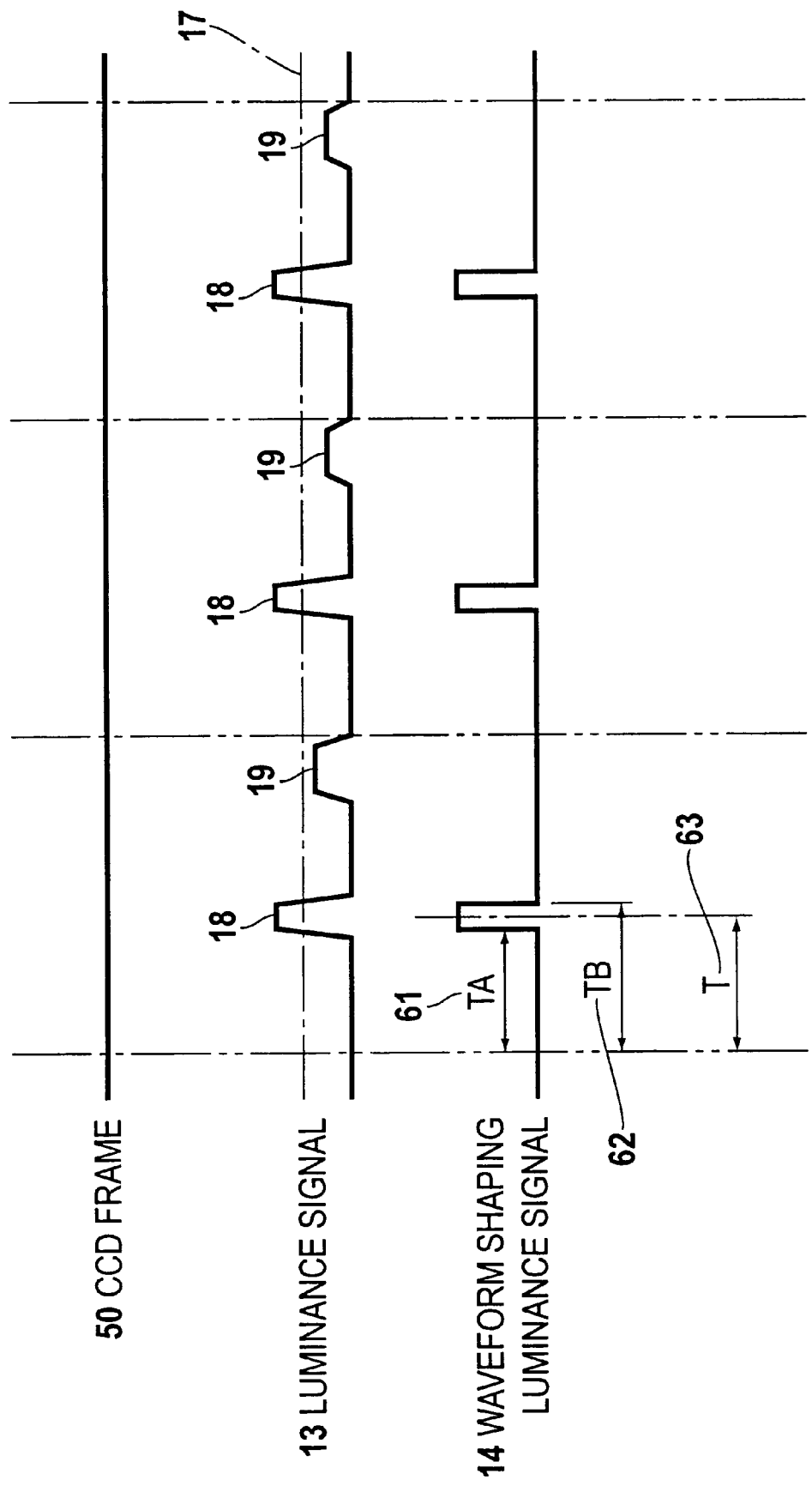
FIG. 3 is a timing chart illustrating operations of an embodiment of the image information processing circuit of the coordinate input system of the invention.

FIG. 2 is a block diagram illustrating a typical image information processing circuit of the coordinate input system of the invention; and FIG. 3 is a timing chart illustrating operations of the block diagram shown in FIG. 2. Coordinate detecting operations of FIG. 1 will now be described by means of these drawings.

When the operator 8 indicates an arbitrary position on the transmissive screen 2 by means of the ray reflecting indicator 1, an infrared ray emitted from the infrared ray source 3 passes through the transmissive screen 2 and is then reflected by the ray reflecting indicator 1. The transmissive screen 2 has a function of dispersing the ray for forming an image from the image ray. The infrared reflected ray reflected by the ray reflecting indicator 1 and returning after passing through the transmissive screen is therefore dispersed to become substantially non-directive, thus permitting image sensing in the CCD camera 4 as a spot-shaped infrared ray.

Coordinate information 6 is determined by processing a luminance signal 13 which is image information of the CCD camera 4, in the image information processing circuit 5. FIG. 3 illustrates a case where the infrared ray reflected by the ray reflecting indicator 1 is sensed as an image having a width corresponding to a plurality of pixels in the horizontal (line) direction of pixels of the CCD camera and a vertical width equal to one pixel, and the luminance signal 13 which is image information of CCD has a luminance component 18 of the spot ray.

In the image information processing circuit 5, the luminance component 19 of a disturbance ray is first eliminated by means of the comparator 11 with threshold voltage 17 to obtain a waveform shaping luminance signal 14. Then, ray spot coordinate information is detected from this waveform shaping luminance signal 14 in a coordinate information generating/retaining circuit 12 and retained therein. The coordinate information can be determined from the emerging timing of a ray spot within the CCD frame 50. However, because the ray spot has a certain magnitude, the waveform shaping luminance signal 14 has a certain pulse width. It is therefore necessary to determine the timing of the width center. In the coordinate information generating/retaining circuit 12, therefore, the timing T63 of the center of the ray spot is determined by, for example, calculating an average over the time TA 61 from the frame top to the leading edge of the waveform shaping luminance signal 14 and the time TB 62 from the frame top to the trailing edge of the waveform shaping luminance signal 14. TA 61 and TB 62 are determined, at the timing of the waveform shaping luminance signal 14, by referring to a horizontal/vertical counter signal 16 representing the time information within the frame generated by a frame timing generating circuit 10. The frame timing of the CCD camera 4 and the horizontal/vertical counter signal 16 are previously synchronized by means of a frame synchronizing signal 15 provided as an output by the frame timing generating circuit 10.

The coordinate information 6 representing a position indicated by the ray reflecting indicator 1 is obtained as described above.

In place of the CCD camera, a two-dimensional PSD sensor may be used as image sensing means. The two-dimensional PSD sensor, providing an analog output of center-of-gravity coordinates in the X and Y-directions of a received ray spot, brings about an advantage of providing coordinate information without a complicated image information processing circuit.

The coordinate input system of the invention is widely applicable to rear projecting display apparatuses. An example in which the present invention is applied to a rear projection display apparatus having a box-shaped enclosure will now be described with reference to FIG. 4.

Figure 4:
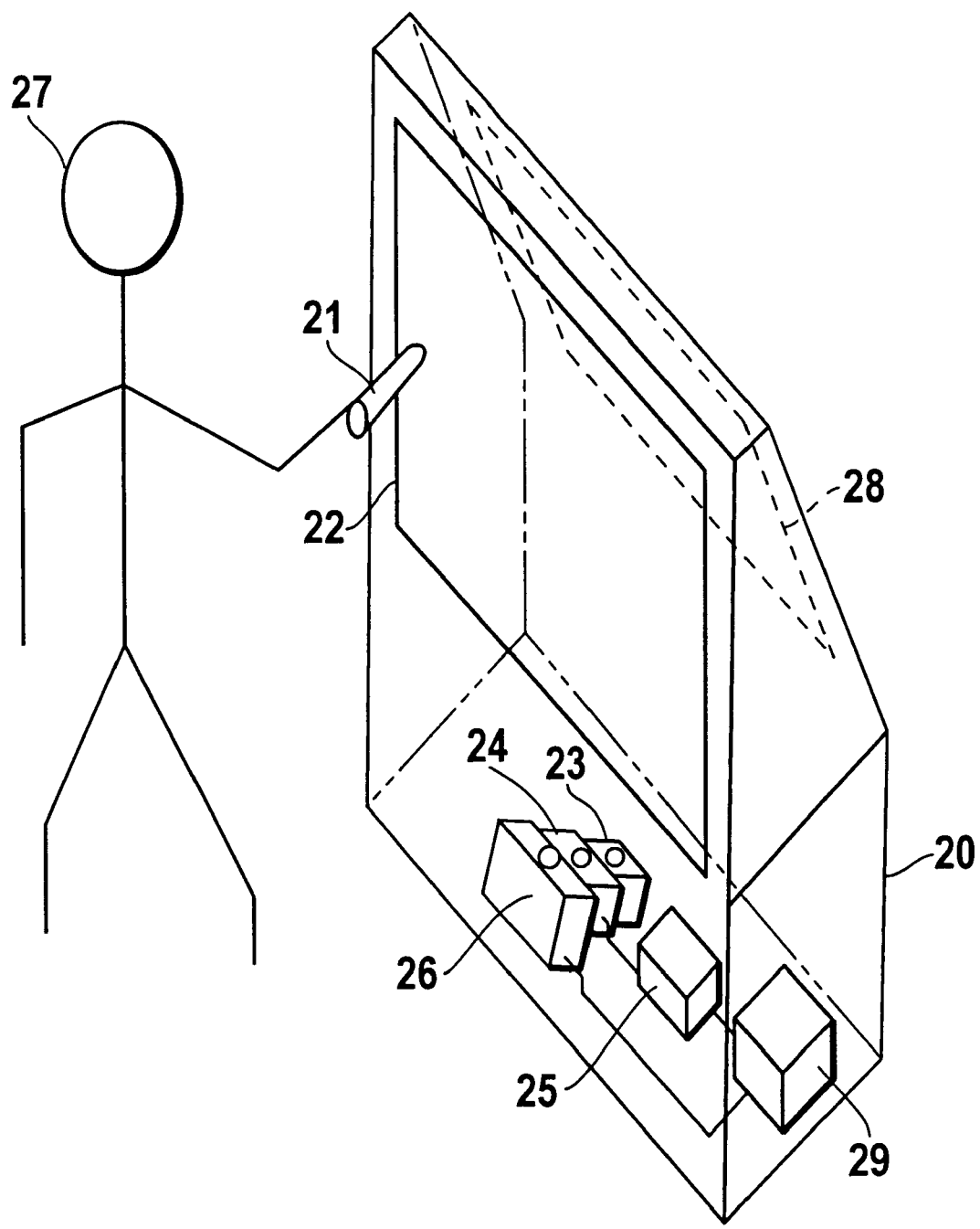
FIG. 4 is a perspective view illustrating an embodiment of the coordinate input system of the invention.

FIG. 4 is a perspective view illustrating an embodiment of the display apparatus provided with the coordinate input system of the invention. The display apparatus shown incorporates a ray reflecting indicator 21, an infrared ray source 23, a CCD camera 24 and an image information processing circuit 25, for imparting a coordinate input function on a transmissive screen 22 of the rear projecting display apparatus 20. For functions as a display apparatus, it has a transmissive screen 22 via a projector 26 and a mirror 28. Provision of the mirror 28 reduces the depth of the rear projecting display apparatus 20 while keeping a projecting distance to the transmissive screen 22.

By setting the infrared ray source 23 and the CCD camera 24 so as to include the transmissive screen 22 via the mirror 28 as viewed from the bottom in the interior of the rear projecting display apparatus 20, it is possible to sense an image from the reflected infrared ray of the ray reflecting indicator 21 by CCD camera 24. Further, by processing the image information through the image information processing circuit 25, there is available reflected infrared ray coordinate information of the ray reflecting indicator 21 as indicated by the operator 27 on the transmissive screen 22. By connecting the image information processing circuit 25 to the built-in computer 29, it is possible to operate the computer 29 by means of the reflecting indicator 21.

Second Embodiment

Figure 5:
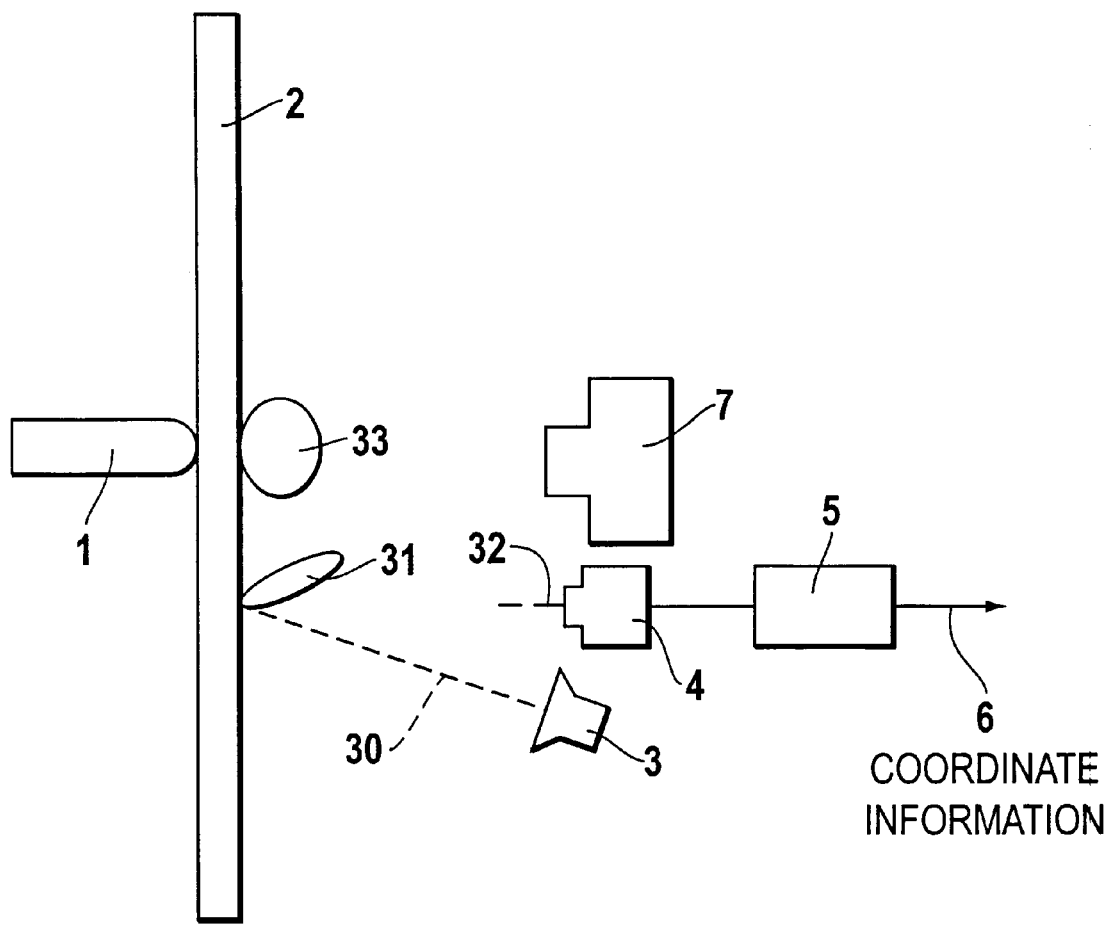
FIG. 5 illustrates another embodiment of the coordinate input system of the invention.

FIG. 5 illustrates an embodiment of the coordinate input system of the invention.

This is the same as the coordinate input system shown in FIG. 1 except that the projecting optical axis 30 of the infrared ray source does not cross the plane of the transmissive screen 2 at right angles, and is represented in the form of a plan view as viewed from a side of the transmissive screen 2 for easy explanation.

In FIG. 5, the coordinate input system has a ray reflecting indicator 1, an infrared ray source 3, a CCD camera 4, and an image information processing circuit 5, for the coordinate input function on the transmissive screen 2, and gives coordinate information 6. A projector 7 is, for example, a liquid crystal projector incorporating a liquid crystal light bulb, a projecting ray source and a projecting optical system, and serves to form an image onto the transmissive screen 2 from an image light.

The infrared light source 3 is infrared ray projecting means which projects an infrared ray which is an invisible ray onto the entire back surface of the transmissive screen 2, and uses, for example, an infrared-wavelength LED. By using a plurality of infrared wavelength LEDs arranged in an array, there is available a more abundant infrared ray output. Interference of an image ray which is visible light can be avoided by projecting the infrared ray which is an invisible ray.

The CCD camera 4 is image sensing means which picks up images over the entire back surface of the transmissive screen 2 for the purpose of detecting a ray reflected by the ray reflecting indicator 1 of the infrared ray emitted from the infrared ray source 3. The CCD camera 4 should preferably have a selective sensitivity to an infrared ray because it is to detect an infrared ray, and should preferably comprise, for example, a two-dimensional CCD provided with an infrared transmissive filter.

The ray reflecting indicator 1 is an indicator for indicating the transmissive screen 2 from the front surface of the transmissive screen, i.e., a plane opposite to the back surface onto which the operator 8 projects an image ray, and has a ray reflecting member at least at the tip thereof. Applicable indicators include, for example, an indicator having a metal-plated tip, an indicator having a mirror at the tip thereof, and an indicator fully made of a light-reflecting metal.

A part of the infrared ray projected from the infrared ray source 3 is reflected from the back surface of the transmissive screen 2. This reflected ray, causing a decrease in the S/N ratio of the reflected ray from the ray reflecting indicator 1, is not desirable in terms of coordinate detection. In this embodiment, therefore, an object is to reduce the rear reflected ray from the transmissive screen 2. The operations carried out for this purpose will now be described.

When the projecting optical axis 30 of the infrared ray source is caused to cross the plane of the transmissive screen 2 at right angles, the rear reflected ray from the transmissive screen 2 would have also the maximum orientation in a direction at right angles to the plane of the transmissive screen 2. When the projecting optical axis 30 of the infrared ray source does not cross plane of the transmissive screen 2 at right angles, the maximum orientation of the directivity property 31 of the rear reflected infrared ray from the transmissive screen 2 has an angular difference from the direction at right angles to the plane of the transmissive screen 2. The incidence optical axis 32 of the CCD camera crosses the transmissive screen 2 substantially at right angles so as to prevent a trapezoidal distortion in the picked-up image. Therefore, since the rear reflected infrared ray does not directly enter the CCD camera 4, it is possible to improve the S/N ratio of the detecting system.

Setting so that the projecting optical axis 30 of the infrared ray source does not cross the plane of the transmissive screen 2 at right angles exerts almost no adverse effect on directivity property of the ray reflected from the ray reflecting indicator 1. This is due to ray dispersibility of the transmissive screen 2, and directivity property 33 of the reflected ray from the ray reflecting indicator remains almost null.

Third Embodiment

Figure 6:
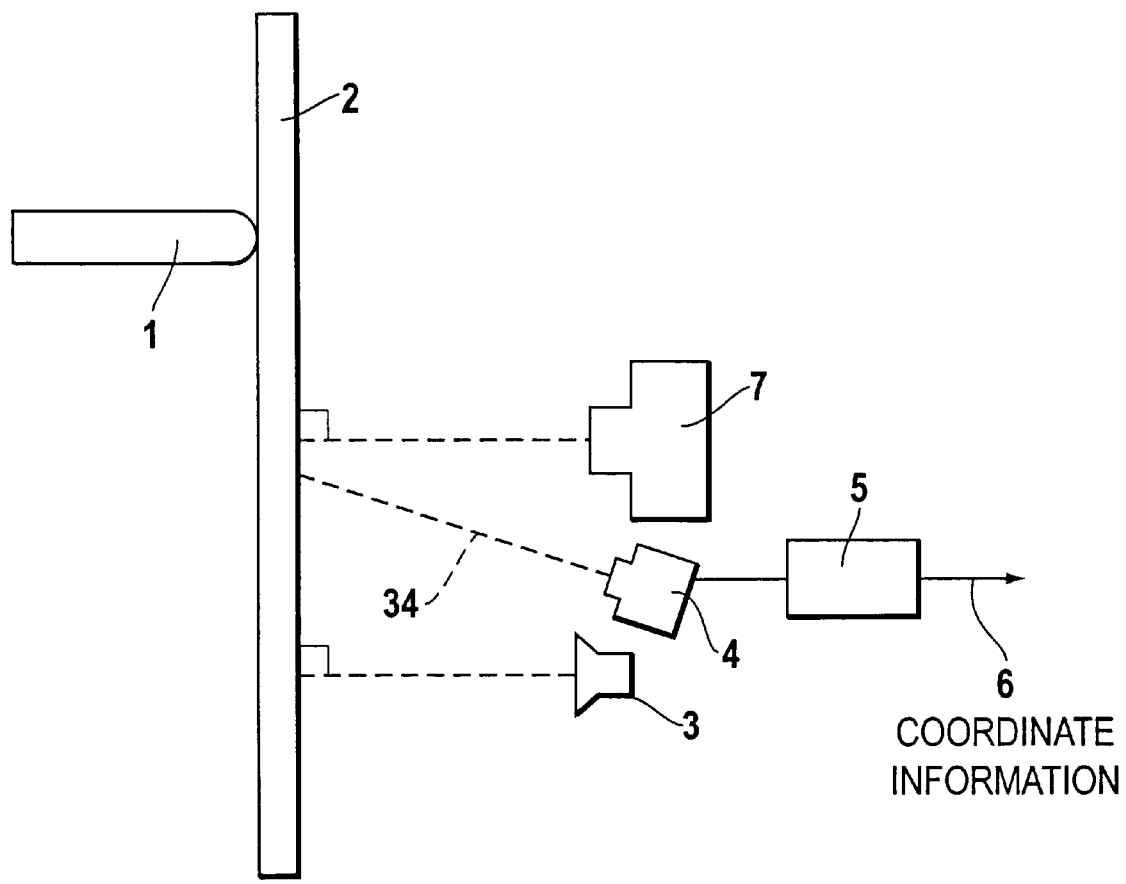
FIG. 6 illustrates still another embodiment of the coordinate input system of the invention.

FIG. 6 illustrates another embodiment of the coordinate input system of the invention.

This is the same as the coordinate input system shown in FIG. 1 except that the incidence optical axis 34 of the CCD camera does not cross the plane of the transmissive screen 2 at right angles, and is represented in the form of a plan view as viewed from a side of the transmissive screen 2 for easy explanation.

In FIG. 6, the coordinate input system has a ray reflecting indicator 1, an infrared ray source 3, a CCD camera 4, and an image picked information processing circuit 5, for the coordinate input function on the transmissive screen 2, and gives coordinate information 6. A projector 7 is, for example, a liquid crystal projector incorporating a liquid crystal light bulb, a projecting ray source and a projecting optical system, and serves to form an image onto the transmissive screen 2 from an image ray.

The infrared ray source 3 is infrared ray projecting means which projects an infrared ray which is an invisible ray onto the entire back surface of the transmissive screen 2, and uses, for example, an infrared-wavelength LED. By using a plurality of infrared wavelength LEDs arranged in an array, there is available a more abundant infrared ray output. Interference of an image ray which is visible light can be avoided by projecting the infrared ray which is an invisible ray.

The CCD camera 4 is image picked means which picks up images over the entire back surface of the transmissive screen 2 for the purpose of detecting a ray reflected by the ray reflecting indicator 1 of the infrared ray emitted from the infrared ray source 3. The CCD camera 4 should preferably have a selective sensitivity to infrared rays because it is to detect an infrared ray and should preferably comprise, for example, a two-dimensional CCD provided with an infrared transmissive filter.

The ray reflecting indicator 1 is an indicator for indicating the transmissive screen 2 from the front surface of the transmissive screen, i.e., a plane opposite to the back surface onto which the operator 8 projects an image ray, and has a ray reflecting member at least at the tip thereof. Applicable indicator include, for example, an indicator having a metal-plated tip, an indicator having a mirror at the tip thereof, and an indicator fully made of a light-reflecting metal.

This embodiment is characterized in that rear reflected ray from the transmissive screen 2 entering the CCD camera 4 can be reduced. The reason is as follows. Because the projecting optical axes of the infrared ray source 3 and the projector 7 cross the plane of the transmissive screen, respectively, the maximum orientations of rear reflected ray thereof cross the plane of the transmissive screen 2 at right angles. As a result, the incidence optical axis 34 of the CCD camera not crossing the plane of the transmissive screen 2 at right angles reduces the amounts of incidence of the rear reflected ray of the infrared ray source 3 and the rear reflected ray of the image ray of the projector 7 as compared with the case of crossing at right angles, thus permitting improvement of the S/N ratio of the infrared reflected ray of the ray reflecting indicator.

Setting the incidence optical axis 34 of the image sensing means so as not to cross the plane of the transmissive screen 2 causes a trapezoidal distortion in the image information sensed by the CCD camera 4 on the transmissive screen 2. By making a coordinate correction in the image information processing circuit 5, it is possible to avoid an adverse effect of the trapezoidal strain.

Fourth Embodiment

Figure 7:
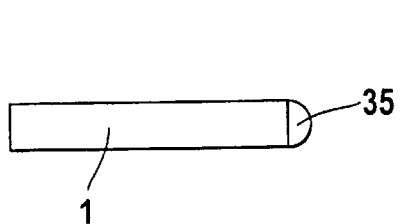
FIG. 7 illustrates an embodiment of the ray reflecting indicator of the coordinate input system of the invention.

FIG. 7 illustrates an embodiment of the ray reflecting indicator of the coordinate input system of the invention.

An infrared ray reflecting film 35 is provided at the tip of a ray reflecting indicator 1. This is a metal thin film having selectivity to the wavelength range of infrared rays.

The infrared rays are selectively reflected by the infrared ray reflecting film 35. Apart from infrared rays, image rays which are visible are projected onto the transmissive screen surface. Because reflection of an image ray is inhibited, however, it is possible to improve the s/N ratio of the infrared reflected ray of the ray reflecting indicator.

A dielectric multi-layer film or the like other than a metal thin film, which has selectivity to infrared rays can give a similar advantage.

Fifth Embodiment

Figure 8:
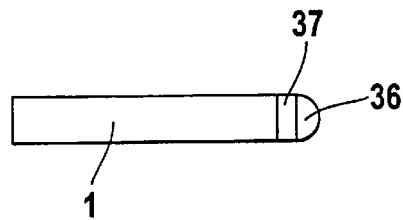
FIG. 8 illustrates another embodiment of the ray reflecting indicator of the coordinate input system of the invention.

FIG. 8 illustrates another embodiment of the ray reflecting indicator of the coordinate input system of the invention.

An infrared transmissive filter 36 and a mirror 37 are provided at the tip of the ray reflecting indicator 1. The infrared transmissive filter is an optical filter having transmissivity selectively for the wavelength region of infrared rays.

A ray entering the infrared transmissive filter 36 is reflected on the mirror 37, passes through the infrared transmissive filter 36 again and leaves it. It therefore serves as an indicator selectively reflecting infrared rays. Apart from infrared rays, image rays which are visible are projected onto the transmissive screen surface. Because reflection of an image ray is inhibited, however, it is possible to improve the S/N ratio of the infrared reflected ray of the ray reflecting indicator.

In this embodiment, a glass filter or a plastic filter may be used as an infrared transmissive filter. This filter is excellent in using it at the tip of the indicator because film peeling does not cause a change in properties even upon occurrence of frictions with the screen, as compared with a reflecting thin film filter. These favorable functions can be achieved with common optical parts such as an infrared transmissive filter and a mirror.

Sixth Embodiment

Figure 9:
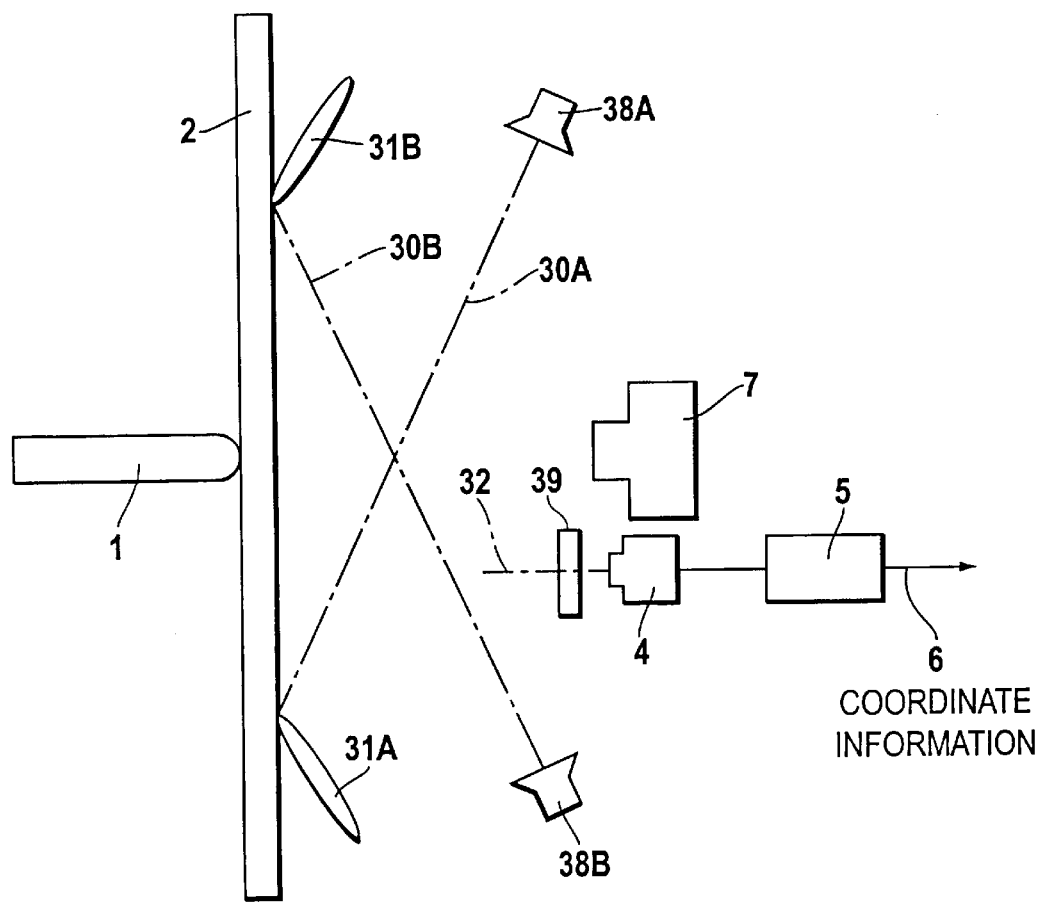
FIG. 9 illustrates further another embodiment of the coordinate input system of the invention.

FIG. 9 illustrates an embodiment of the coordinate input system of the invention.

This is the same as the coordinate input system shown in FIG. 1 except that an infrared transmissive filter is provided in the CCD camera 4, with a plurality of infrared ray sources, and the projecting optical axis of the infrared ray source does not cross the plane of the transmissive screen 2 at right angle, and FIG. 9 is a plan view as viewed from a side of the screen for easy explanation.

In FIG. 9, the coordinate input system has a ray reflecting indicator 1, an infrared ray source 38A and another infrared ray source 38B, a CCD camera 4, and an image information processing circuit 5, for the coordinate input function on the transmissive screen 2, and gives coordinate information 6. A projector 7 is, for example, a liquid crystal projector incorporating a liquid crystal light bulb, a projecting ray source and a projecting optical system, and serves to form an image onto the transmissive screen 2 from an image ray.

The infrared ray source 38A and 38B are infrared ray projecting means which project an infrared ray which is an invisible ray onto the entire back surface of the transmissive screen 2, and use, for example, an infrared-wavelength LED. By using a plurality of infrared wavelength-LEDs arranged in an array, there is available a more abundant infrared-ray output. Interference of an image ray which is visible light can be avoided by projecting the infrared ray which is an invisible ray.

The CCD camera 4 is image sensing means which picks up images over the entire back surface of the transmissive screen 2 for the purpose of detecting a ray reflected by the ray reflecting indicator 1 of the infrared ray emitted from the infrared ray source 3. The CCD camera 4 is provided with an infrared transmissive filter 39 to ensure a selective sensitivity to an infrared ray because it is to detect an infrared ray.

The ray reflecting indicator 1 is an indicator for indicating the transmissive screen 2 from the front surface of the transmissive screen, i.e., a plane opposite to the back surface onto which the operator 8 projects an image ray, and has a ray reflecting member at least at the tip thereof. Applicable indicators include, for example, an indicator having a metal-plated tip, an indicator having a mirror at the tip thereof, and an indicator fully make of a ray-reflecting metal.

Presence of a plurality of infrared ray sources including an infrared ray source 38A and an infrared ray source 38B, a feature of this embodiment, will now be described.

In order to detect the ray reflecting indicator 1, the infrared ray source must project an infrared ray as uniformly as possible to the entire plane of the transmissive screen 2. In the case where there is only a single infrared ray source, luminance generally exhibits the highest value at the center of the projecting optical axis of the ray source, and is lower on the periphery. An infrared cannot therefore sufficiently be projected in some cases onto the periphery of the transmissive screen 2. In this embodiment, therefore, the plurality of ray sources including the infrared ray sources 38A and 38B are provided, and a more uniform infrared ray projection is achieved by projecting the infrared ray onto different areas of the back surface of the transmissive screen 2.

While the case with two infrared ray sources has been described in this embodiment, three or more infrared ray sources may be provided. This brings about an advantage of further improving uniformity of the infrared projected ray.

Angles of incidence of the projecting optical axes of the plurality of infrared ray source to the transmissive screen, different from each other, forming a feature of this embodiment, will now be described.

When the projecting optical axis of the infrared ray source is caused to cross the plane of the transmissive screen 2 at right angles, the rear reflected ray from the transmissive screen 2 would have also the maximum orientation in a direction at right angles to the plane of the transmissive screen 2. The incident optical axis 32 of the CCD camera is caused to cross the transmissive screen 2 at right angles so as to avoid occurrence of a trapezoidal strain in the picked-up image. As a result, it becomes easier for the rear reflected ray to enter the CCD camera 4. The projecting optical axis of the infrared ray source does not therefore cross the transmissive screen 2, and should preferably diagonally enter the transmissive screen 2 as far as possible.

When infrared rays are projected onto the back surface of the transmissive screen 2 from the infrared ray source 38A and 38B, the infrared ray can be projected more diagonally to the transmissive screen by using different angles of incidence for the individual optical axes to the transmissive screen 2, i.e., by setting these optical axes so that the projecting optical axis 30A of the infrared ray source 38a cross the projecting optical axis 30B of the infrared ray source 38B, for example, as shown in FIG. 9. In this case, the directivity property 31A of the rear reflected ray of the infrared ray source 38A and the directivity property 31B of the rear reflected ray of the infrared ray source 38B from the transmissive screen 2 have a considerable difference in angle to a direction at right angles to the plane of the transmissive screen 2 as shown in FIG. 9, thus enabling to reduce intensity of the reflected ray in a direction at right angles to the plane of the transmissive screen 2 to a low level. Because the rear reflected infrared ray does not therefore enter directly the CCD camera 4, it is possible to improve the S/N ratio of the detecting system.

Further, the infrared transmissive filter 39 provided on the incident optical axis 32, a feature of this embodiment, will now be described.

The infrared transmissive filter 39 has an optical selectiveness allowing transmission of a ray within the infrared wavelength range, such as a glass filter. It is needless to mention that a plastic filter, a metal thin film filter or a dielectric multi-layer film filter may also be applicable. Rays entering the infrared transmissive filter 39 include the rear reflected ray from the transmissive screen 2 of the image ray which is visible, and a disturbance ray passing through the filter from the surface of the transmissive screen 2. It is possible to optically remove disturbance rays of non-infrared rays not pertinent to detection of coordinates and hence improve the S/N ratio of the detecting system.

It is possible to optically remove disturbance rays of infrared ray wavelength not pertinent to coordinate detection by using a band transmissive filter as the infrared transmissive filter 39, and by causing the ray transmissive wavelength range thereof to agree with the wavelength range of the infrared ray reflected selectively by the ray reflecting indicator 1, and hence to improve the S/N ratio of the detecting system.

Seventh Embodiment

Figure 10:
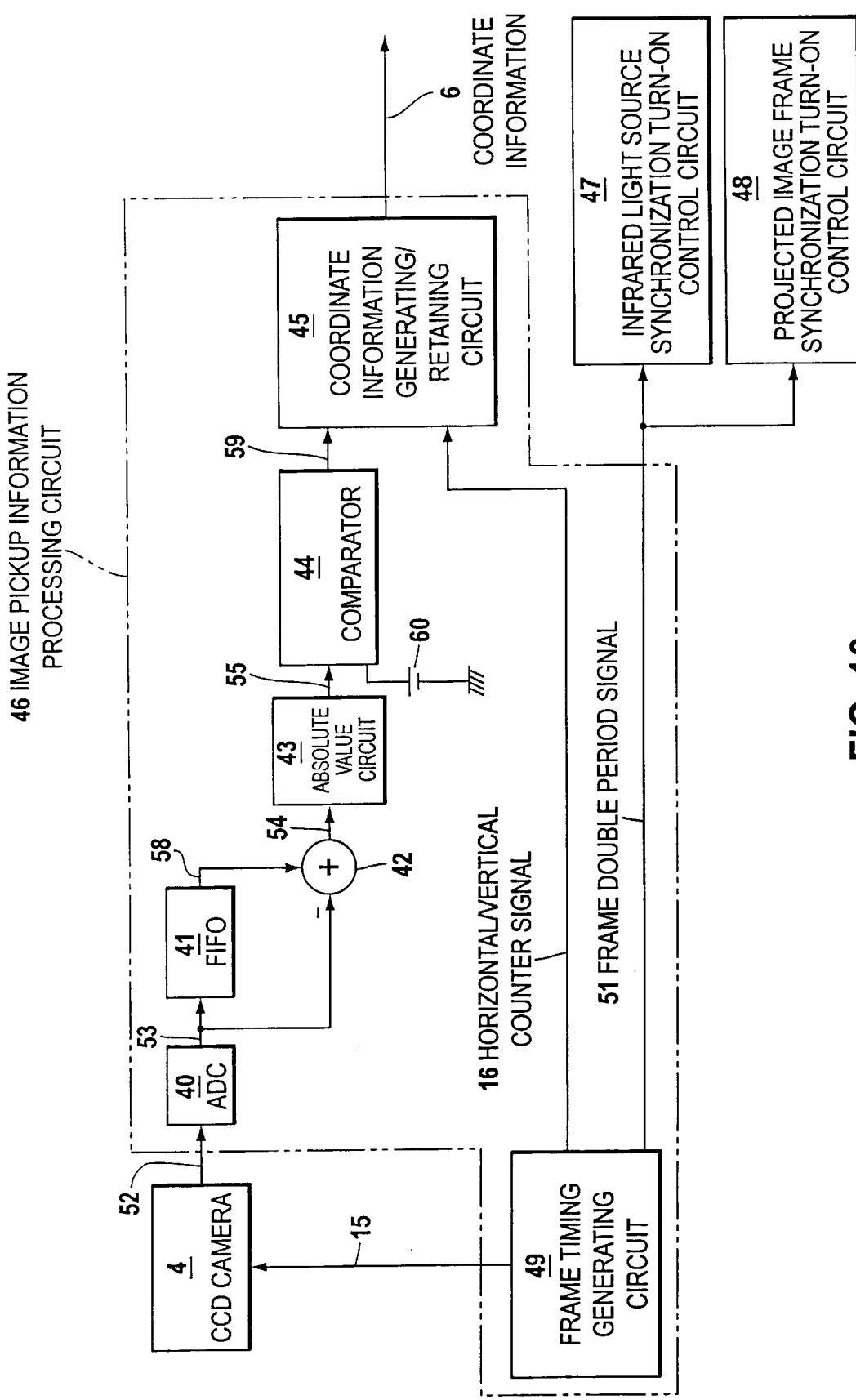
FIG. 10 is a block diagram illustrating an embodiment of the coordinate input system of the invention.

FIG. 10 is a block diagram illustrating an embodiment of the coordinate input system of the invention.

A CCD camera 4 serves as image sensing means.

An image information processing circuit 46 is a processing circuit for generating coordinate information from output information of the CCD camera 4, and comprises an A/D converter 40, an FIFO 41, a subtracter 42, an absolute circuit 43, a comparator 44, a coordinate generating/retaining circuit 45, and a frame timing generating circuit 49. The A/D converter 40 converters a CCD luminance signal 52 from an analog signal to a digital signal. The FIFO 41 is a First-In-First-Out memory having a capacity corresponding to one frame of CCD, and is used for bringing a luminance signal 53 which is a digital signal in delay for a period of one frame. The coordinate information generating/retaining circuit 45 carries out generation and retaining of the coordinate information. It synchronizes a frame timing of the CCD camera 4 with a horizontal/vertical counter signal 16 by means of a frame synchronizing signal 15 provided as an output of a frame timing generating circuit 49.

Figure 11:
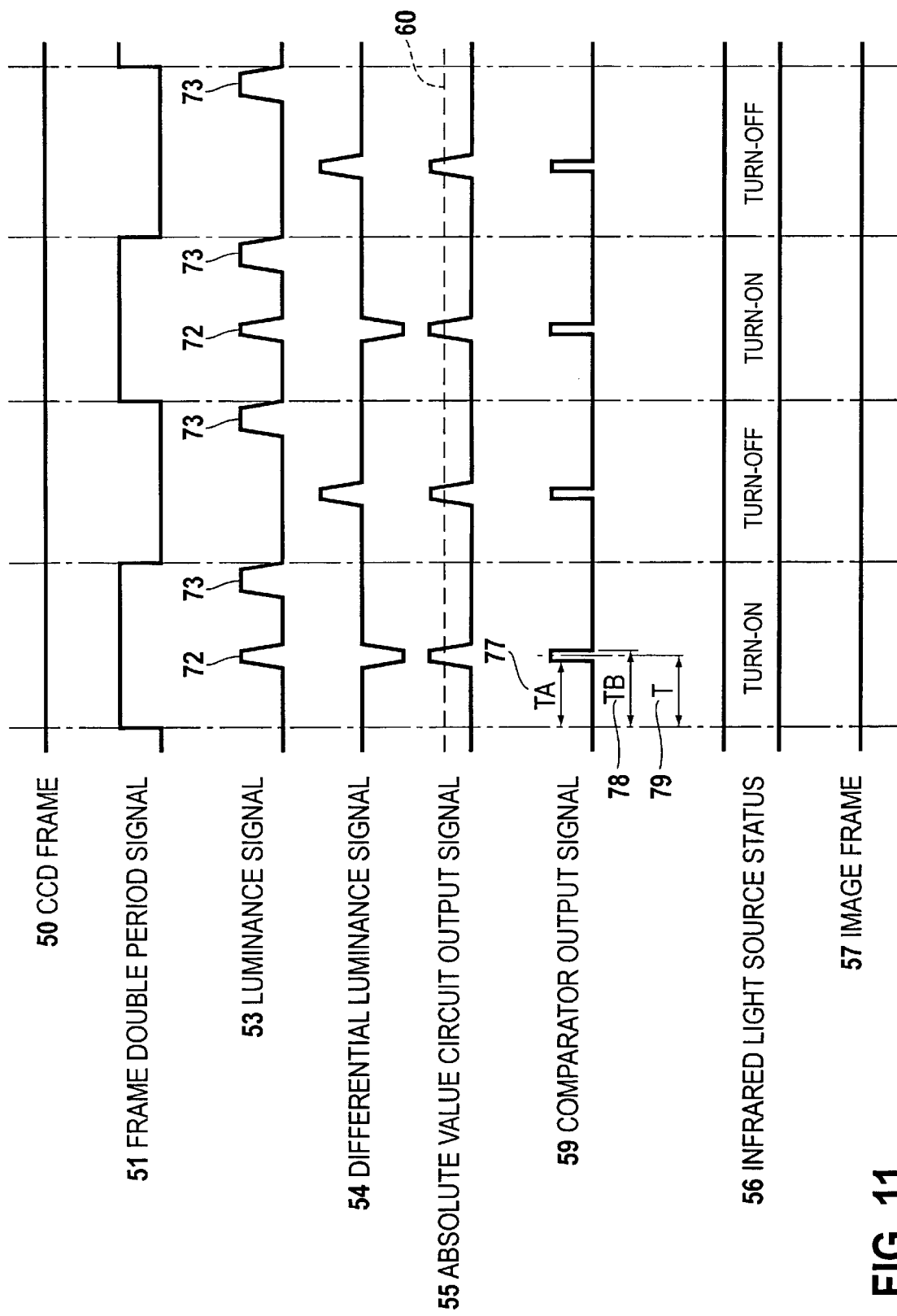
FIG. 11 is a timing chart illustrating operations in an embodiment of the coordinate input system of the invention.
Figure 12:
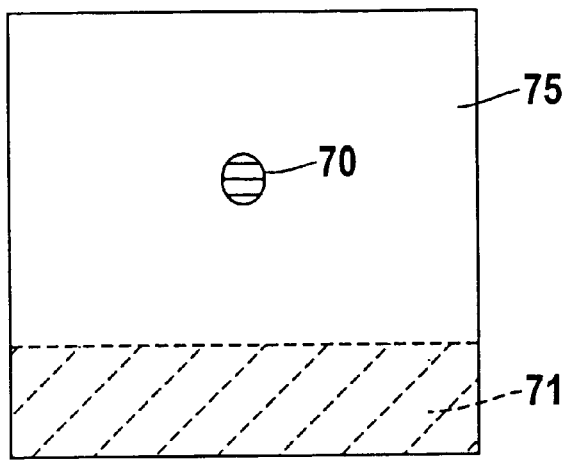
FIG. 12 illustrates an example of the CCD pickup image upon turn-on of the infrared ray source for describing the coordinate input system of the invention.
Figure 13:
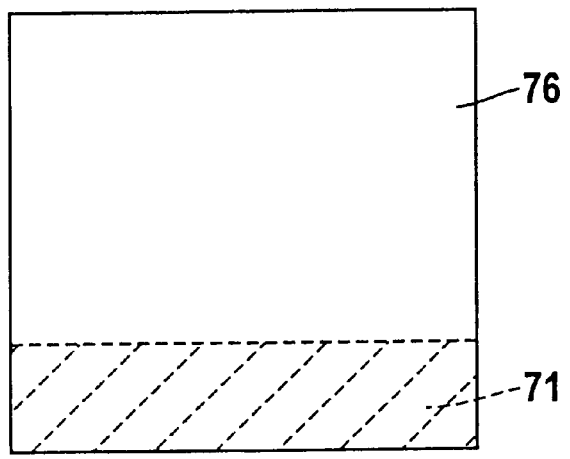
FIG. 13 illustrates an example of the CCD pickup image upon turn-off of the infrared ray source for describing the coordinate input system of the invention.

FIG. 11 is a timing chart illustrating operations in the block diagram of FIG. 10. To describe these operations, an example of the CCD pickup image upon turn-on of the infrared ray source is illustrated in FIG. 12, and an example of the CCD pickup image upon turn-off of the infrared ray source is illustrated in FIG. 13. The operations of FIG. 10 showing this embodiment will be described with reference to these drawings.

A disturbance ray 71 appearing in the frame image 75 upon turn-on of the infrared ray source and in the frame image 76 upon turn-off of the infrared ray source is, for example, the direct sun light shining on a projection screen, and acts as a disturbance when detecting a spot ray 70 from the ray reflecting indicator. While the disturbance ray 71 such as the sun light is substantially stationary and appears in a plurality of frames, contrary, the spot ray 70 appears only in a frame upon turn-on of the infrared ray source, and does not appear in the frame image 76 upon turn-off of the infrared ray source. In a luminance signal 53, which is an output of the CCD camera 4, a luminance component 72 of these spot rays and a luminance component 73 of the disturbance rays appear.

By determining a difference in luminance signal 53 between consecutive frames when repeating turn-on and turn-off the infrared ray source 56 for each of consecutive CCD frames, it is possible to remove a luminance component 73 of a disturbance ray appearing in all the consecutive frames, and to extract luminance components 72 of spot ray appearing every other frame. A one-frame delayed luminance signal 58 and a no-delay luminance signal 53 are entered into the subtracter 44 to obtain a differential luminance signal 54.

An absolute value of the differential luminance signal 54 is determined through the absolute value circuit 43, and a negative value component of the differential luminance signal 54 are converted into a positive value. A waveform-shaped comparator output signal 59 is obtained by waveform-shaping an absolute value circuit output signal 55 with a positive value threshold voltage 60 in the comparator 44. Then, the coordinate information generating/retaining circuit 45 converts time information, which is obtained by referring to a horizontal/vertical counter signal 16 generated by the frame timing generating circuit 49 at a timing of a change in the comparator output signal 59, into coordinate information 6. In order to detect the center of the spot ray so that a reflection spot resulting from the reflecting indicator has a certain size, it is necessary to determine the center of a time width of the luminance component of the comparator output signal 59. The center timing T 79 of the ray spot is thus obtained by, for example, determining an average value over a time TA 77, which is from the frame top to the leading edge of the comparator output signal 59, and the time TB 78, which is from the frame top to the trailing edge of the comparator output signal 59.

By determining the difference in the luminance signal between turn-on and turn-off of the infrared ray source in the image information processing circuit 46 as described above, it is possible to eliminate the effect of a disturbance ray not pertinent to positional detection.

Eighth Embodiment

FIGS. 10 and 11 illustrate an embodiment of the coordinate detector of the present invention.

More particularly, an infrared ray source synchronized turn-on control circuit which controls turn-on of the infrared ray source for detecting the ray reflecting indicator is controlled by the use of a signal representing the CCD frame timing, i.e., a frame double-period signal 51 which is a signal showing a change in status in synchronization with switching of the frame, with the time for two frames as one period. This causes the status 56 of the infrared ray source to change to turn-on or turn-off in synchronization with switching of the CCD frame.

In this case, there is available image information of the CCD camera 4 upon turn-on or turn-off of the infrared ray source in the consecutive frames. When obtaining a difference between image information upon turn-on and image information upon turn-off of the infrared ray source, it suffices to determine the difference between two consecutive frames, thus permitting processing at a higher speed than in determination of a difference between two frames distant from each other.

Ninth Embodiment

FIGS. 10 and 11 illustrate and embodiment of the coordinate detector of the invention.

More particularly, a projected image frame synchronization control circuit 48 of the projector is controlled by the use of a signal representing the CCD frame timing, i.e., a frame double-period signal 51 which is a signal showing a change in status in synchronization with switching of the frame, with the time for two frames as one period. This causes synchronization of the CCD frame with the image frame 57 for image display.

In this case, image rays have often a high correlation between the consecutive frames, i.e., images of the consecutive frames are often substantially the same. It is therefore possible to eliminate almost completely the effect of the screen back surface of the image ray forming a disturbance in detecting positional coordinates by determining a difference in two pieces of image information between consecutive frames.

Tenth Embodiment

Figure 14:
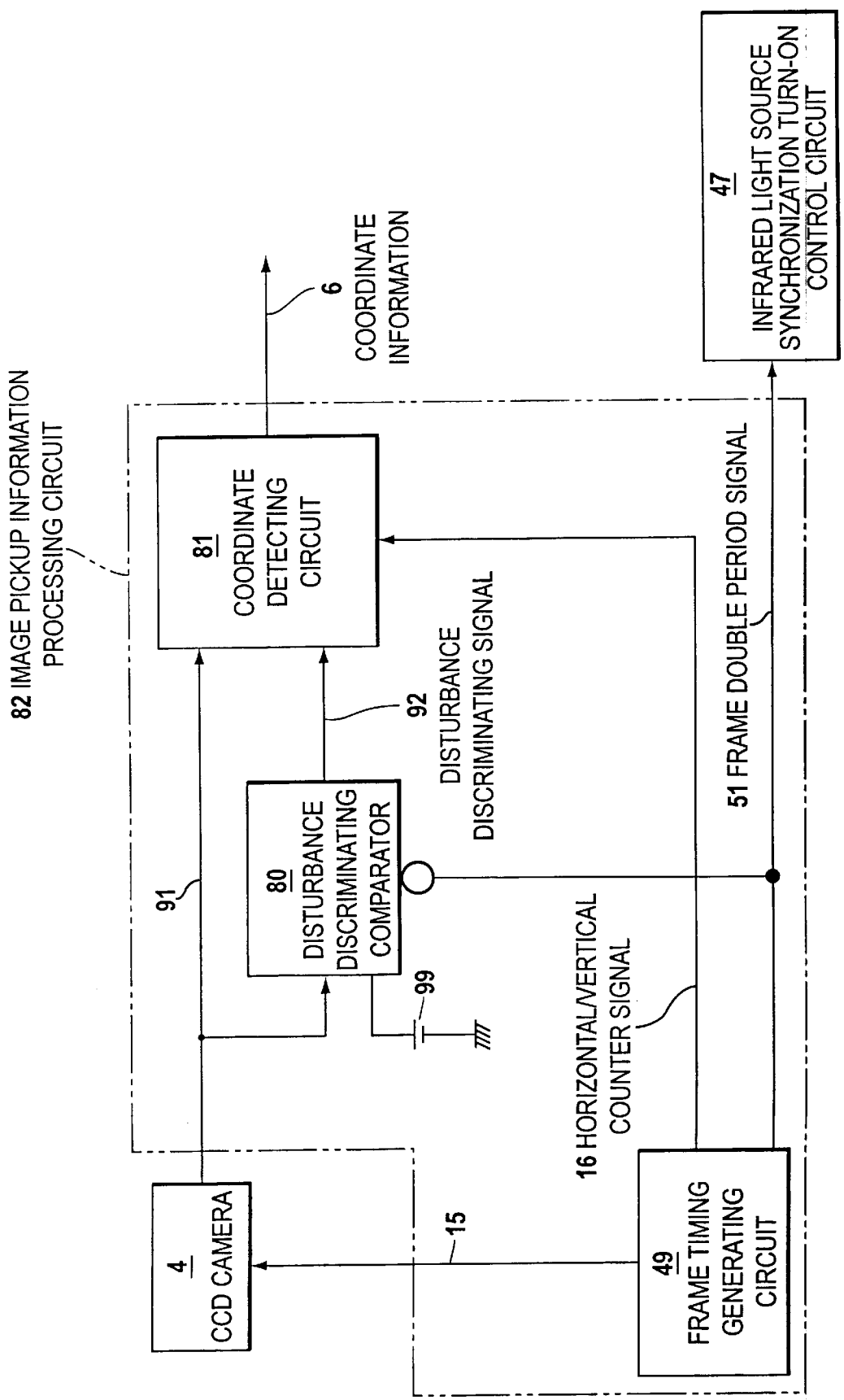
FIG. 14 is a block diagram illustrating further another embodiment of the coordinate input system of the invention.

FIG. 14 is a block diagram illustrating an embodiment of the coordinate input system of the invention.

A CCD camera 4 is used as image sensing means.

An image information processing circuit 82 comprises a coordinate detecting circuit 81, a disturbance discriminating comparator 80 and a frame timing generating circuit 49. The coordinate detecting circuit 81 is circuit which receives a luminance signal 91 which is output information of the CCD camera 4 and generates coordinate information 6 from a horizontal/vertical counter signal 16 representing the timing in the CCD frame, and retains these pieces of information therein. The frame timing generating circuit 49 is a circuit generating a timing of the CCD frame and synchronizes the frame timing of the CCD camera 4 with the horizontal/vertical counter signal 16 by means of a frame synchronization signal 15. The infrared ray is turned on and turned off in synchronization with switching of the frame by controlling an infrared ray source turn-on control circuit 47 with a frame double-period signal 51 which is a signal representing a change in status in synchronization with switching of the frame with the time for two frames as one period.

The disturbance discriminating comparator 80 is means for discriminating a disturbance by determining the level of a disturbance ray from the luminance signal 91, an output of the CCD camera 4. When a disturbance ray of at least a certain level is present, the coordinate detecting operation of the coordinate detecting circuit 81 is prohibited by a disturbance discriminating signal 92.

Figure 15:
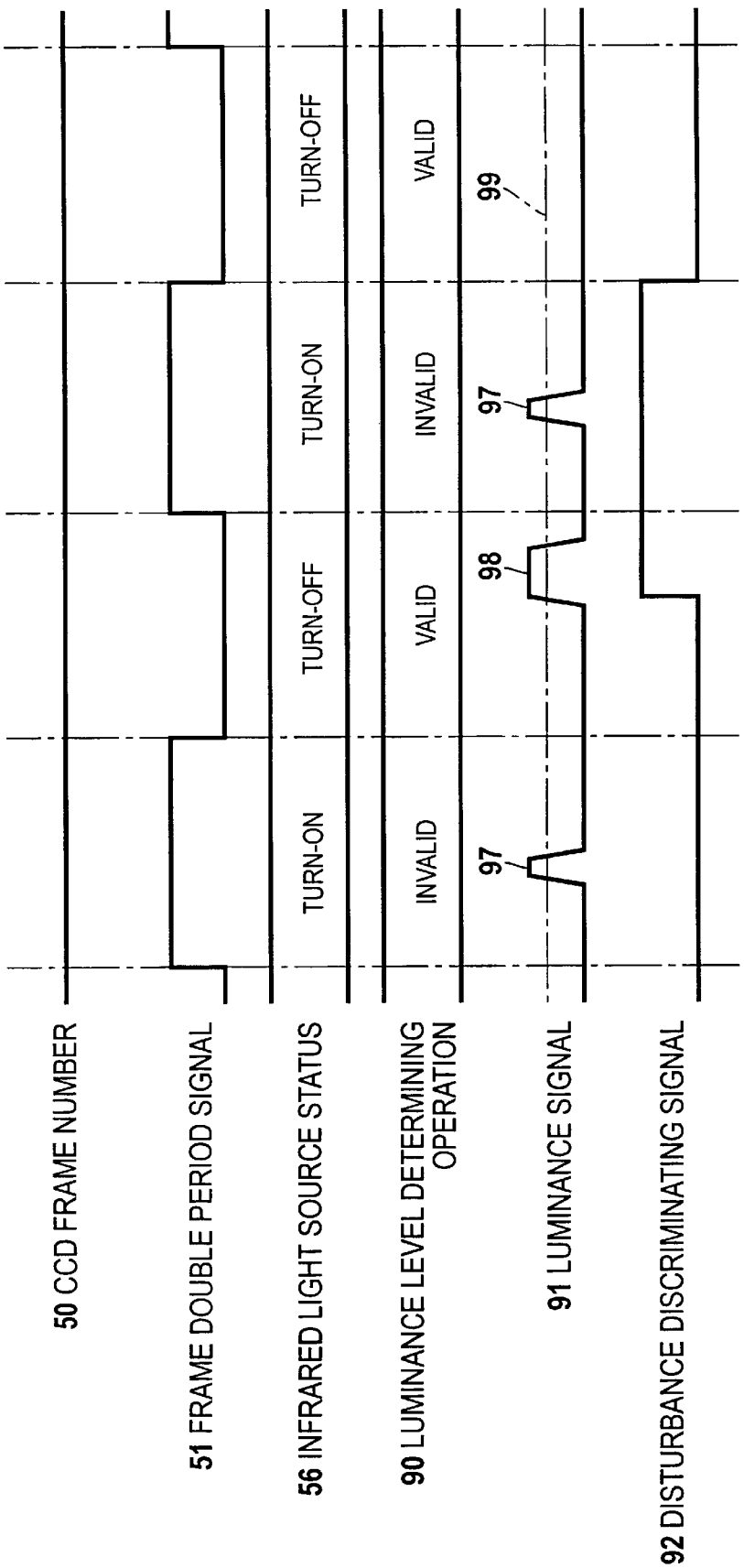
FIG. 15 is a timing chart illustrating operations in an embodiment of the coordinate input system of the invention.
Figure 16:
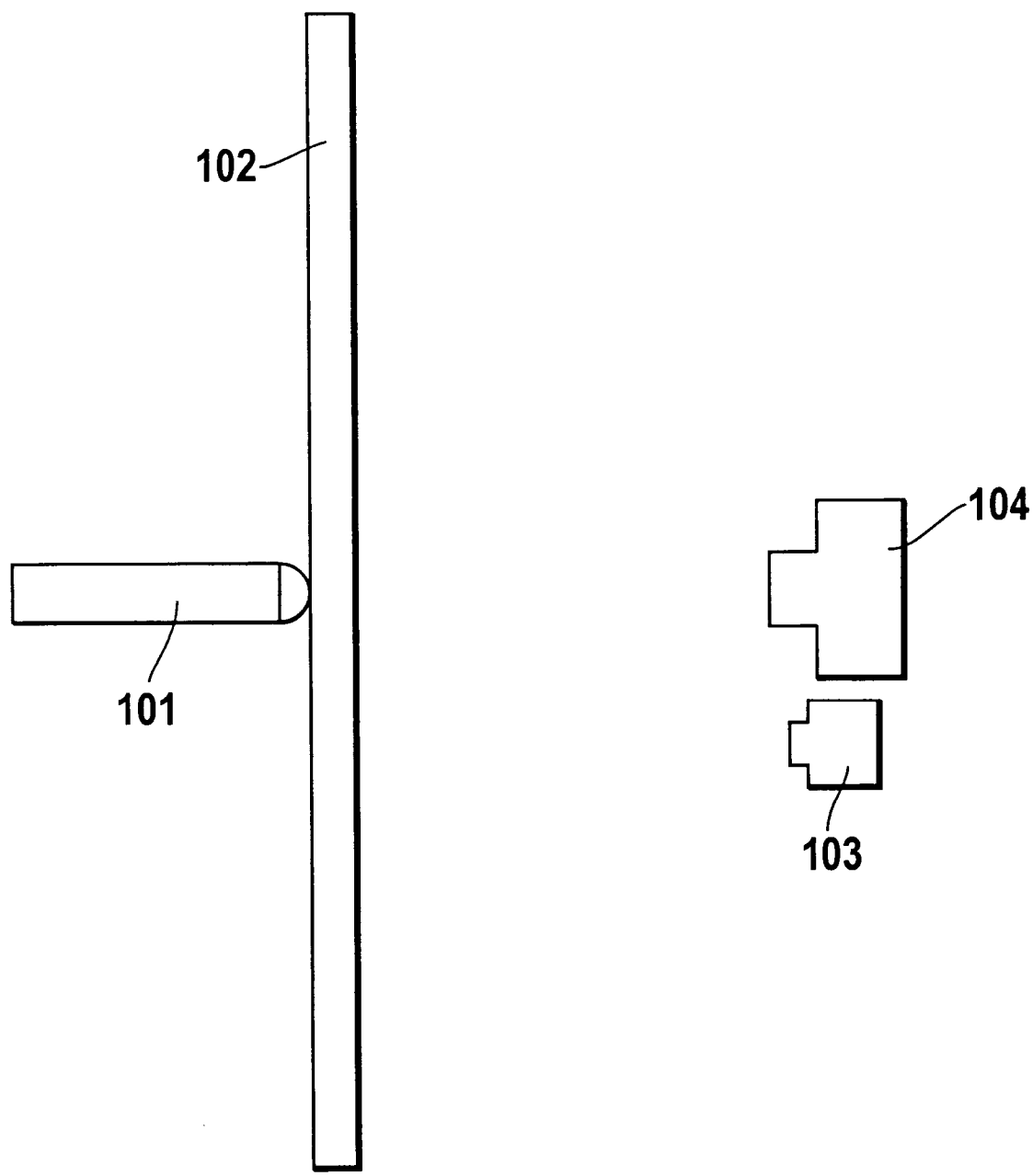
FIG. 16 illustrates a typical conventional coordinate input system.

FIG. 15 is a timing chart illustrating operations of the block diagram shown in FIG. 14. The operations of FIG. 14 will now be described with reference to FIG. 15.

The infrared ray source status 56 repeats turn-on and turn-off for each frame for controlling the infrared ray source synchronized turn-on control means circuit 47 by means of the frame double-period signal 51. The luminance component upon turn-off of the infrared ray source is not due to the ray reflected from the ray reflecting indicator, and is therefore a disturbance component. To detect this, the luminance level determining operation 90 of the disturbance discriminating comparator 80 is made valid in the infrared ray source turn-off frame.

The luminance component 97 of the spot ray from the ray reflecting indicator of the luminance signal 91 in the infrared ray turn-on frame is ignored since the luminance determining operation 90 is invalid. When a luminance component 98 of the disturbance ray is present in the infrared ray source turn-off frame, the disturbance discriminating comparator 80 validates the disturbance discriminating signal 92, considering that the presence of the luminance component 98 represents detection of a disturbance of over a prescribed threshold voltage 99, and prohibits the coordinate detecting operation by communicating the validation to the coordinate detecting circuit 81. When the luminance component 98 of the disturbance ray is once detected, the disturbance discriminating signal 92 keeps the status at least until the luminance level determining operation 90 changes from invalid to valid, thereby ensuring prevention of a malfunction caused by a disturbance.

When the luminance level of image information, which is an output of the image sensing means upon turn-off of the infrared ray source, exceeds a prescribed level, as described above, which represents occurrence of a disturbance of over a certain level, provision of the disturbance discriminating comparator prohibiting coordinate detection permits prohibition of coordinate detection and hence prevents an erroneous input.

Various variations and modifications are possible without being limited to the aforementioned embodiments within the scope of the present invention.

(1) While the projector has been described by the use of a liquid crystal projector incorporating a liquid crystal light bulb, there are applicable also a projector incorporating optical modulation means which uses a mirror device based on the micromachine technology, a projector using a CRT, and other projectors.

(2) The embodiments have been described as a coordinate input system. These coordinate input techniques are however for imparting a coordinate input function to the screen of a projecting display apparatus, and are therefore applicable as they are to a display apparatus.

As described above, the coordinate input system of the invention, which imparts a coordinate input function to a transmissive screen for image display, comprises infrared ray projecting means which projects an infrared ray onto the back surface of the transmissive screen; indicating means which has ray reflecting means reflecting the infrared ray projected from the infrared ray projecting means, at the tip thereof; image sensing means which picks up the infrared ray reflected by the indicating means from the front surface of the transmissive screen, from the back surface of the transmissive screen; and image information processing means which determines coordinates on the transmissive screen as specified by the indicating means from an output image signal of the image sensing means. According to this configuration, it is possible to eliminate the necessity of a cell or electronic components in a positional indicator, and to achieve an easy-to-use coordinate input system.

What is claimed is:

1. A coordinate input system, that provides a coordinate input function to a transmissive screen which forms an image projected by an image projector, comprising:

an invisible ray projector which projects invisible rays to a plane of said transmissive screen;

an invisible ray detector which detects reflected rays which are reflected ones of the invisible rays; and a coordinate processor which determines coordinates relative to said transmissive screen based on an output signal generated by the invisible ray detector.

2. The coordinate input system according to claim 1, the invisible ray projector having a projection optical axis that is not normal to the plane of said transmissive screen.

3. The coordinate input system according to claim 1, the invisible ray detector having an optical axis that is not normal to the plane of said transmissive screen.

4. The coordinate input system according to claim 1, the invisible ray projector comprising a plurality of invisible ray sources which project the invisible rays to different areas of the plane of said transmissive screen.

5. The coordinate input system according to claim 4, the plurality of invisible ray sources having projection optical axes that are not normal to the plane of said transmissive screen, and angles of incidence of the projection optical axes of said plurality of invisible ray sources with the plane of said transmissive screen are different from each other.

6. The coordinate input system according to claim 1, further comprising a synchronizer which synchronizes a turn-on and a turn-off timing of the invisible rays projected by the invisible ray projector with a frame timing of the invisible ray detector.

7. The coordinate input system according to claim 1, further comprising a synchronizer which synchronizes a frame timing of the image projected by the image projector with a frame timing of the invisible ray detector.

8. The coordinate input system according to claim 1, the coordinate processor having a disturbance discriminator which compares a luminance level of a turn-off signal generated by the invisible ray detector when the invisible rays are turned off a determination level.

9. The coordinate input system according to claim 1, further comprising an indicator that reflects the invisible rays projected by the invisible ray projector to produce the reflected rays.

10. The coordinate input system according to claim 9, the indicator including one of an object having a metal-plated tip, a mirror tipped object, or a light reflecting object.

11. The coordinate input system according to claim 9, the indicator having a reflective member, the reflective member having a selectivity for infrared rays.

12. The coordinate input system according to claim 9, the indicator comprising:

an optical filter that selectively allows transmission of infrared rays; and an optical reflective member.

13. The coordinate input system according to claim 9, the invisible ray detector having an optical filter which selectively allows transmission of a wavelength range of the reflected rays produced by the indicator.

14. The coordinate input system according to claim 13, the wavelength range being in an infrared range.

15. The coordinate input system according to claim 1, the output generated by the invisible ray detector being a turn-on signal when the invisible rays projected by the invisible ray projector is turned on, and the output generated by the invisible ray detector being a turn-off signal when the invisible rays projected by the invisible ray projector is turned off.

16. The coordinate input system according to claim 15, the coordinate processor includes a subtracter which generates a difference between the turn on signal and the turn off signal.

17. The coordinate input system according to claim 1, the invisible ray detector including a CCD camera.

18. The coordinate input system according to claim 1, the invisible ray projector and the invisible ray detector facing the same side of the plane of the transmissive screen.

19. A display apparatus provided with a transmissive screen which forms an image projected by an image projector, the apparatus comprising:

an infrared ray projector which projects infrared rays onto a back of said transmissive screen;

an indicating device, the indicating device reflecting the infrared rays from a front of the transmissive screen producing reflected rays;

an image sensor which senses from the back of the transmissive screen an image of the reflected rays; and an image information processor which determines coordinates specified by the indicating device on said transmissive screen based on an output image signal provided by said image sensor.

20. The coordinate input system according to claim 19, the indicating device including one of an object having a metal-plated tip, a mirror tipped object, or a light reflecting object.

21. The coordinate input system according to claim 19, the image sensor including a CCD camera.

* * * * *